Figure 3:
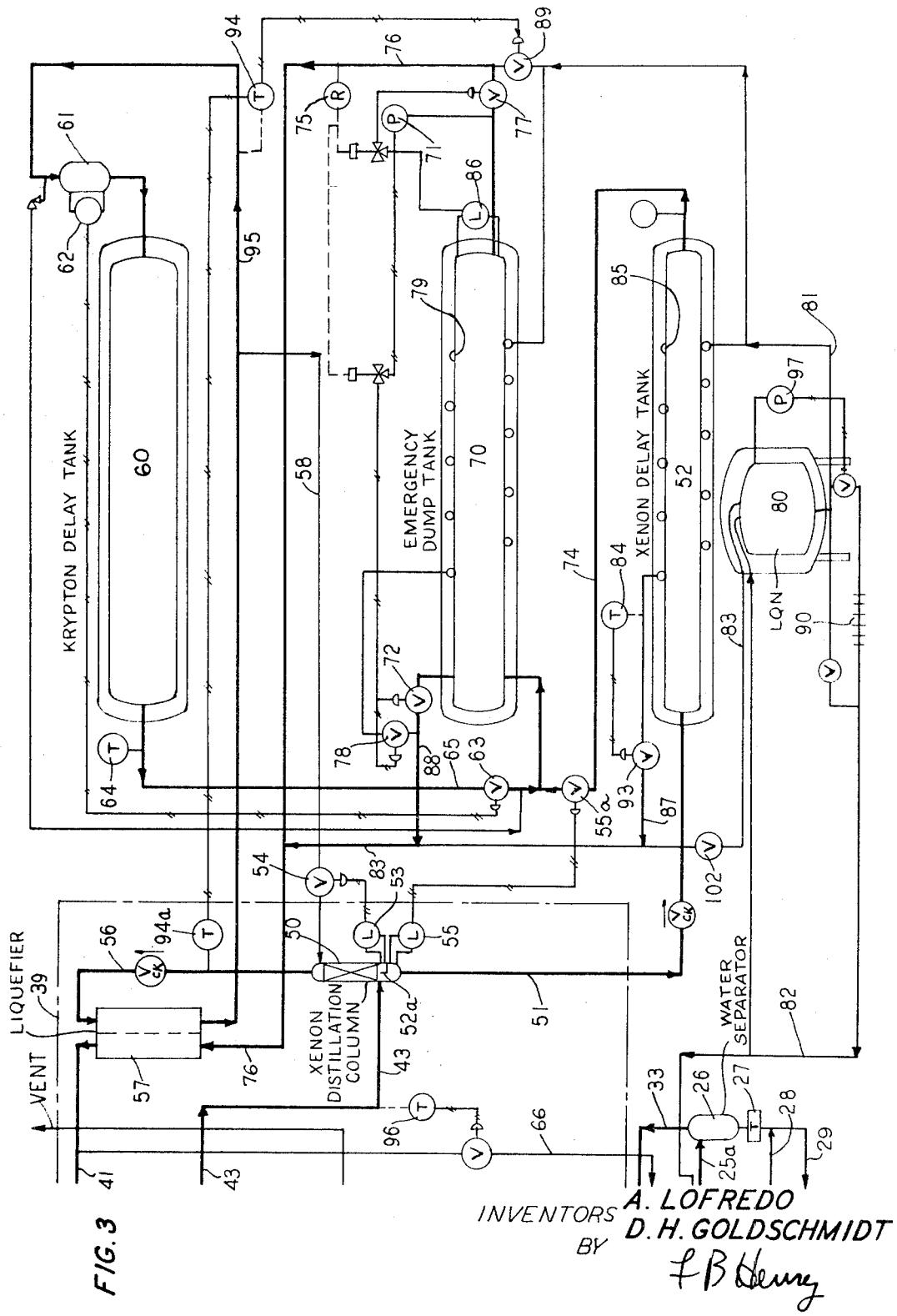

United States Patent [19]

Lofredo et al.

[11] 3,748,864
[45] July 31, 1973

[54] PROCESS FOR RECOVERY AND CONTAINMENT OF RADIOACTIVE GASES

[75] Inventors: Anthony Lofredo, Springfield, N.J.; David H. Goldschmidt, Forest Hills, N.Y.

[73] Assignee: Airco Inc., New York, N.Y.

[22] Filed: Jan. 21, 1969

[21] Appl. No.: 792,650

[52] U.S. Cl............................ 62/22, 62/9, 62/11, 62/24, 62/21, 176/37, 252/301.1 W
[51] Int. Cl............................ F25j 3/00, F25j 3/06
[58] Field of Search .................. 62/9, 11, 12, 13, 62/14, 15, 17, 18, 22-24, 27-29, 40; 176/37; 252/301.1 W

[56] References Cited
UNITED STATES PATENTS

| 3,041,134 | 6/1962 | Weeks | 176/37 |
|---|---|---|---|
| 3,155,469 | 1/1964 | Lehmer et al. | 176/37 |
| 3,191,393 | 6/1965 | Dennis | 62/40 |
| 3,203,866 | 8/1965 | Lehmer et al. | 62/18 |
| 3,404,067 | 10/1968 | Rendos | 62/17 |
| 3,469,410 | 9/1969 | Schramm et al. | 176/37 |
| 3,501,923 | 3/1970 | Lehmer | 176/37 |

*Primary Examiner*—Norman Yudkoff
*Assistant Examiner*—Arthur F. Purcell
*Attorney*—Edmund W. Bopp and H. Hume Mathews

[57] ABSTRACT

This invention relates to apparatus and methods for the removal and safe containment of radioactive krypton and xenon present in the air leakage stream of a nuclear plant utilizing a boiling water reactor. The invention utilizes cryogenic techniques to separate the xenon and krypton isotopes from the air and then stores the same until they are no longer a safety hazard.

16 Claims, 3 Drawing Figures

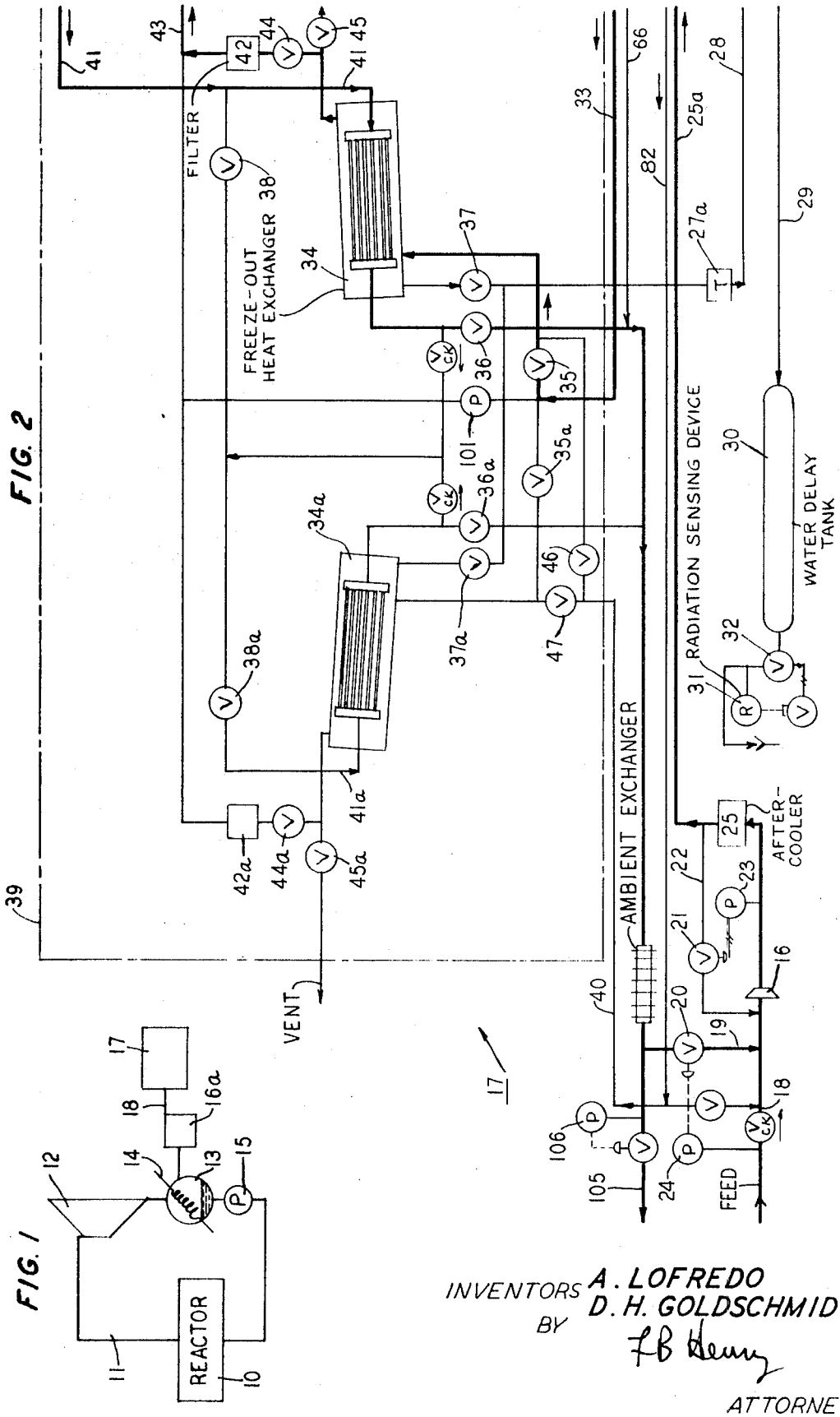

INVENTORS
A. LOFREDO
D. H. GOLDSCHMIDT
BY
F.B. Henry
ATTORNEY

PROCESS FOR RECOVERY AND CONTAINMENT OF RADIOACTIVE GASES

Public utilities are becoming more interested in switching to nuclear power generating plants due to the fact that the cost for building and operating these plants, as compared with conventional plants has lessened and due to the cleanliness of the nuclear operation. Legislation to prevent air pollution has greatly increased the costs of operating conventional power plants. The utilities are now turning to nuclear plants to avoid these increased costs and to insure a clean atmosphere.

Although various reactor designs are available it has been found that the boiling water reactor embodies numerous design advantages and is preferred by the power companies. Steam is generated directly in the reactor and an external steam generator (heat exchanger) is not required. The only pumping requirements are those needed for returning water from the turbine condenser to the reactor vessel.

Thus the boiling water reactor is less expensive to build and operate than the conventional water cooler reactor. The steam which is generated in the boiling water reactor has a much lower density than liquid water and its radioactivity is less intense. The steam does however become slightly radioactive in the reactor and depositions of radioactive material may be left in the turbine, condenser and feed-water pumps. This radioactive carry over is minimized to the extent possible by the use of solid fuel elements with suitable cladding to retain the fission products. To the extent that the carry over takes place it must be controlled and its effects minimized. One effect which results from the carry over is the contamination of air which leaks into the condenser. Normally the condenser is operated under vacuum. The air which leaks into the condenser quickly becomes contaminated and since it is vented to the atmosphere, steps must be taken to reduce the level of contamination of the vented air to acceptable levels.

The amount of air which normally leaks into the condenser is kept to a minimum. This gas leakage into the condenser must be removed and the radioactive krypton and xenon present in the air leakage stream must be removed and/or contained until it is safe for release to the atmosphere. One approach that has been proposed is to direct the air leakage to a series of holding chambers which are surrounded by necessary shielding and which serve to contain the leakage for the storage period required to reduce the radioactivity to acceptable levels. The leakage is then directed up very tall smoke stacks, hundreds of feet in height. The release at high altitudes allows still further time for the lessening of the radioactivity of the leakage stream as it drifts in the air currents and then ultimately back to earth in a supposedly safe form. This type of system is necessarily very expensive to build, requires much space and employs unsightly smoke stacks. Enormous stacks emanating from nuclear stations have an adverse psychological effect on residents of nearby communities. The local people usually don't understand why such stacks exist since the generating station isn't burning anything. They then usually learn that the stacks are distributing radioactive contaminants into the atmosphere. This is difficult to explain and justify and results in strained relations with the community. Due to cost considerations, the safety factor in this conventional system or the ability of this system to handle an unexpected level of radioactive leakage, is less than that necessary to fully allay the fears of the public.

Furthermore, nuclear plants have the capability of going under ground and it is anticipated that in the future a great many nuclear power plants will be out of sight. The abovementioned conventional scheme for removing radioactivity from the leakage is entirely incompatible with an underground site in that it uses stacks and large holding chambers.

Keeping in mind the above problems and proposed solutions, it is the object of the present invention to provide a system for the clean-up and containment of the exhaust gases emanating from a nuclear power plant to prevent radioactive poisoning of the atmosphere surrounding the plant. The proposed system utilizes cryogenic techniques to remove the comparatively easily condensible components, such as water and carbondioxide from the air leakage stream and then substantially liquefies and separately stores the xenon and krypton isotopes.

Another object is to provide a clean-up and storage system which is safe to operate, economical to build and maintain and highly efficient in its ability to eliminate the escape of radioactive contaminants.

Another object is to provide a clean-up system which is small in size and unobtrusive in character so that the system may be readily installed within a nuclear station and architectural and topographical problems may be minimized.

Another object is to eliminate the need for large and costly holding systems and for tall, expensive and unsightly smoke stacks for the dispersion of contaminants.

Other objects are simplicity of structure, economy of manufacture, ease and convenience of servicing, and efficiency and dependability of operation.

With these objects in view, as well as other objects which will appear in the course of the specifications, reference will be made to the accompanying drawing, wherein;

FIG. 1 is a schematic illustrating the basic flow diagram of a boiling water reactor;

FIG. 2 and FIG. 3, taken together, is a process flow diagram for an off gas treatment plant designed in accordance with the preferred embodiment of the invention.

In FIG. 1 there is illustrated the basic flow diagram for a boiling water reactor power generating plant. The reactor 10 boils water and the steam obtained is directed through appropriately shielded lines 11 to turbine 12 which is used to run a generator. A condenser 13 is operated under a vacuum and pulls a suction on the turbine 12. Suitable coolant is forced through the condenser coils 14 to condense the steam. A pump 15 then returns the cool water to the reactor for recycle. As mentioned above the condenser suffers air in-leakage which becomes radioactively contaminated. The air leakage occurs through the low pressure stages and glands of the turbine and through joints and porous walls of the exhaust piping and condenser shell. Air may also be brought into the system in the feed water. It has been found that in modern condenser systems, the average leakage falls between 2 and 5 SCFM. Various techniques have been devised to remove this air leakage from the system. Steam ejectors 16(a) pull a vacuum on the condenser 13 in the conventional manner and the air leakage stream is directed into line 18 and delivered to the gas treatment plant 17 which will now be described in detail.

For general indication of the functions of the more significant system sensing and condition-responsive devices shown schematically as circles, the following letters within respective circles represent the condition to which the device is sensitive or responsive: P for fluid pressure, T for temperature, R for radiation and L for liquid level.

In FIG. 2 and FIG. 3, when coupled together, there is illustrated the preferred form of the proposed gas treatment plant. The feed to the plant 17 from the condenser comes through line 18 and joins with a recycle stream from line 19. Since the air leakage rate may vary, a recycle arrangement is used to maintain a constant flow to the compressor. The pressure in the inlet feed line to the plant is maintained constant by automatically adjusting a valve 20 in the recycle line to the compressor. The movement of valve 20 is controlled by an adjustable pressure regulator 24 which senses the pressure in the feed line 18. As air leaks into the steam condensers, the pressure in the feed line rises and the pressure regulator senses this and closes or adjusts the valve 20 so that the compressor sucks down the feed line pressure to its desired value. If there is no leakage into the condenser the recycle valve 20 would remain open and provide the entire flow that the compressor requires.

The compressor 16 forces the air into an aftercooler 25 which removes the heat of compression and cools the air to close to the temperature of the cooling water being circulated through the cooler. Part of the moisture in the air will condense in the aftercooler. The condensed water is separated from the main process stream, line 25a in the separator 26 and is sent to a float operated condensate trap 27. This water stream then joins with a similar water stream coming from the trap 27a which is water that is condensed out in the freeze-out exchanger, which is described below.

To prevent excess pressure buildup in the system, a pressure regulator 2-3 controls a valve 21 in the compressor bypass line for maintaining the desired system pressure, which in a typical system might be 80 psia.

This combined condensate stream is sent by line 29 to a water delay tank 30, designed to give the desired holdup (approximately 15 days) thereby insuring that any radioactive xenon or krypton dissolved in the water will be rendered nonradioactive, prior to releasing the water. Should the water delay system function improperly, and the exiting water stream register too high a redioactive decay rate, a sensing device 31 will close valve 32 in the drain line.

The air leaving the top of the separator 26 goes through line 33 and switching valve 35 to the shell side of a freeze-out heat exchanger 34 where it is gradually cooled to approximately −265.3°F. As the air is cooled from its inlet temperature of about +73°F, moisture condenses out. Once the air temperature is less then +32°F, water will freeze out on the surface of the tubes. At an air temperature of −211°F, carbon dioxide will start to freeze out on the exchanger tubes. These temperatures would depend on the system pressure used. The $CO_2$ concentration in the air leaving the freeze-out exchanger is extremely small (approximately 2.0 ppm). A pair of freeze-out heat exchangers 34, 34a are used, one being on stream and the other off-stream. In a typical design each freeze-out exchanger is designed to stay on stream 45 days without plugging up. After 45 days of service, the exchangers are switched using valves 35–38, 44–47, 35a–38a, 44a and 45 a, and the second duplicate unit is put onstream and the fouled exchanger is taken out of service.

Since both xenon and krypton will deposit with the ice and $CO_2$, the freeze-out exchanger containing trapped xenon and krypton is held off stream for 44 days. This renders the solidified krypton and xenon particles essentially nonradioactive. While the isolated exchanger is being held for 44 days, it is continuously being warmed up by the ambient heat leak through the cold box in which the exchangers are located, as indicated by broken line 39. As the exchanger warms up, the ice and solid $CO_2$ will melt and vaporize and the shell side pressure will increase. At 70°F, the exchanger pressure will be approximately 300 psia. If the heat leak in 44 days is not enough to warm up the exchanger, some of the exiting recycle gas at ambient temperature is directed through valves 36a and 38a from the on-stream exchanger to the off-stream exchanger. The refrigeration that this recycle gas receives in warming up the off-stream freeze-out exchanger, is dissipated in the ambient exchanger prior to sending it to the compressor. Once the off-stream exchanger has been warmed up, its contents are vented until the pressure drops close to atmospheric. The remaining water and $CO_2$ is purged out using warm nitrogen taken from line 40. A water and carbon dioxide analyzer is used to indicate when complete removal of water and $CO_2$ has been accomplished.

Cool-down of the freeze-out exchanger prior to placing it in operation, is done with nitrogen liquid; lines 82, 40, slowly introduced into the shell side. When the nitrogen exit temperature registers −150°F, the cool-down is considered essentially completed.

The pressure drop across the freeze-out exchanger is constantly monitored to indicate when the exchanger should be taken out of service. Should the pressure drop exceed preset limits, an alarm; connected across the exchangers as indicated at 101, will sound off indicating adverse conditions. In the plant illustrated in FIG. 2, the freeze-out exchangers are designed to remain on stream for approximately 44 days.

The cold end of the freeze-out exchanger is physically elevated above the warm end, to insure that condensed water will drain out the warm end and not flow into colder sections where it would freeze up. Due to this positioning, no liquid air can be allowed to from at the cold end, since liquefaction establishes high internal recirculation rates which appreciably reduce the heat transfer rate. In order to prevent this, the tube side fluid from liquefier 57 is brought in through line 41 at a predetermined low temperature insufficient to cause liquefaction in the shell side. At design conditions, the heat load represented by the incoming air stream containing both water and $CO_2$ depositing on the shell side, is such that the lowest exit shell side temperature possible is above the liquefaction temperature. Therefore, no liquefaction of the air can occur. Since water and solid $CO_2$ can be entrained in the vapor stream, the air is filtered as it leaves the freeze-out exchanger in filter 42. Corresponding parts in the off-stream exchanger system have the corresponding number plus the "a" added.

The air stream leaving the freeze-out exchanger at approximately −265°F, then goes through switching valve 44 and line 43 to the packed distillation column 50. The function of the column is to concentrate all the xenon present in the inlet stream into the liquid stream leaving the column at the bottom. Since xenon has a higher boiling point than krypton it is concentrated in the liquid stream and is directed through line 51 to the xenon delay storage tank 52.

The design flow of liquid out the packed section of the column is controlled by maintaining a fixed head above a submerged orifice plate 52(a). A level control 53 keeps the head of liquid above the plate fixed by regulating the reflux flow control valve 54 into the top of the column. The liquid exiting from the orifice plate then flows to the bottom of the column where another liquid level control assembly 55 maintains a constant flow of liquid through and out of the xenon delay tank by regulating valve 55a. The xenon delay tank always operated full of liquid; thus no fluid can have a residence time in the delay tank less then the design time. The tank is designed to give the delay time of 45.3 days which is required to render this stream essentially free from radioactivity. The vaporization of the reflux liquid supplies the refrigeration required by the column.

The air vapor leaving the top of the column 50 through line 56 is at its dew point and contains practically all the radioactive krypton that came into he plant. This air is liquefied and subcooled in the liquefier subcooler 57 against the returning cold streams to be vented.

The liquefier-subcooler exit is placed above the distillation column. This provides a net driving force to get the liquid reflux into the column through line 58.

The subcooled liquid air stream is sent into the krypton delay tank 60, which has a design holdup time of 53 hours, thereby rendering the radioactive krypton isotopes safe. The liquid leaving the liquefier-subcooler flows into a liquid level tank 61 elevated slightly above the krypton delay tank. This insures that the krypton tank is always full of liquid. The flow control assembly 62 operates in the same fashion as for the xenon tank, and controls valve 63 in the outgoing line 65. In order to avoid vapor formation caused by heat leaking into the inner vessel of the krypton tank, the liquid was subcooled in the liquefier-subcooler 57. As the liquid stream flows through the krypton tank, it is warmed up and exits at a temperature which is colder than the boiling point for air at the same pressure.

The delay tanks 52 and 60 are elongated cryogenic containers packed with sand to insure even flow distribution throughout the width of the tank. The contaminated liquid which enters one end of the tank moves through the length of the tank due to the fact that it is continually being displaced and forced toward the discharge end. The transit time is the delay time required for the radioactivity to decrease to an acceptable level.

A temperature alarm 64 at the exit of the krypton vessel indicates any sudden deterioration of the vacuum in the insulation space of the krypton vessel, which is a highly unlikely phenomena. A vacuum gauge connected to the instrument panel board (not shown) allows the operator to detect a gradual deterioration of the vacuum. A similar type system exits for the xenon tank outlet.

The exiting liquid from the krypton tank flows through line 65 to an emergency dump tank 70. The tank is maintained at a predetermined pressure by means of a pressure controller 71 controlling the vapor vent valve 72 of the tank, which vents vapor by lines 88 and 83 into the low pressure side of the liquefier subcooler. This emergency tank serves two very important purposes In the rare case that a xenon storage tank should require maintenance work, its contents could be easily transferred to the emergency dump tank 70 through line 74 without having to wait 45 days until its contents would be safe to vent. Secondly, in case of any malfunction in the system which could cause the recycle stream to be too "hot" for venting, the emergency tank can be filled and this provides a stop gap measure that allows the plant to remain unattended for the time it takes to fill the dump tank. An alarm 75 sensitive to certain radioactivity levels (set points) will sound as soon as the malfunction occurs and the dump tank then stores the liquid received from the tanks 60 and 52. While it is fillng, steps should be taken to determine the cause of the excess radioactivity.

The instrumentation functions as follows: If the radioactivity of either the liquid or vapor stream leaving the emergency dump tank is above the set point, the radioactivity recorder controller 75 immediately closes both the vapor and liquid valves 72, 77, in the lines leaving the emergency dump tank 70, thereby preventing any radioactively unsafe air from eventually being vented to the atmosphere. At the same time valve 78 is opened which allows liquid nitrogen to start to flow through a coil 79 in the annular vacuum space surrounding the inner vessel of tank 70, thereby preventing the tank pressure from rising above a desired pressure as it fills up with liquid. The pressure level in the dump tank will be kept lower than that in the krypton and xenon delay tanks to insure flow. The liquid nitrogen (LQN) is supplied from a storage tank 80 which has a conventional pressure building circuit including pressure indicator controller 97 which controls a valve leading to vaporizer 90 and which can also supply liquid through line 81 or 82 or vapor through lines 82, 83. The liquid nitrogen consumption in dump tank 70 is controlled so as to be just enough to maintain desired tank pressure by means of a tank pressure indicating controller 71 which also controls valve 78. Since the tank 70 normally operates at 10percent capacity, it can last for a number of days before it is full and the tank pressure builds up to the maximum system and compressor outlet pressure (80 psig) thereby putting the plant on automatic recycle. This safety feature insures that only radioactively safe substances will be vented to the atmosphere.

Correspondingly, the liquid leaving the xenon tank 52 is sent to the emergency tank. In order to prevent vapor formation in the xenon delay tank, a coil 85 is wrapped around the inner vessel. Liquid nitrogen flowing through that coil, prevents ambient heat from leaking into the inner vessel. The temperature of the exhaust nitrogen is sensed by temperature recorder 84 which automatically controls valve 93. By controlling the exit nitrogen temperature to a desired low temperature, one is assured that the liquid in xenon tank 52 will be subcooled and no vapor formation will occur, and secondly that no liquid nitrogen is exiting from the coil. This method of control was chosen because a serious problem could arise if the xenon tank exit temperature was used for controlling the liquid nitrogen flow. The problem is that one discovers the mishap 45 days too late, and the only recourse left is to use the emergency dump tank. The basic flaw is that by measurin the tank exit temperature, it is already too late to apply any corrective measures since the material leaving the delay tank would still be radioactive. To insure equal input and output flow rates from the emergency tank, a liquid level assembly 86 on the emergency tank 70 controls the tank outlet flow control valve 77. The liquid outlet valve 77 from the emergency tank also serves as a pressure throttling valve reducing the high pressure feed stream to the low pressure recycle stream. This low pressure recycle stream then mixes with the flashed liquid nitrogen used for plant refrigeration coming from valve 89 and together they are sent in line 76 to the cold end of the liquefier-subcooler 57.

Valve 89 is controlled by means of temperature sensor 94 which monitors the temperature in the subcooled liquid line 95 from the liquefier. The set point for the liquid temperature in line 95 is controlled by the temperature in line 56 to the liquefier as indicated by temperature indicator controller 94a. Thus if the temperature in line 56 is too high, valve 89 will be opened to admit additional refrigeration in the form of cold nitrogen into the liquefier subcooler 57.

The nitrogen stream 87 used in the annular space of the xenon tank combines in line 76; with the vapors in lines 88, 83 vented respectively from the emergency tank and the liquid nitrogen storage tank. This combined vapor stream is also sent to the cold end of the liquefier-subcooler. The refrigeration of these combined streams are recaptured in the liquefier-subcooler and in the freeze-out exchanger 34. The resultant stream exiting from the warm end is then sent to the compressor inlet where part of it is used as recycle as necessary and the remainder vented from line 105. A pressure regulator 106 maintains a desired minimum pressure in the system. If the temperature in the main stream line 43, as sensed by temperature recorder 96, is sufficiently low, than part or all of the cold nitrogen stream from the liquefier may be passed through line 66 which bypasses the freeze-out exchanger 34.

The liquid nitrogen tank which supplies the refrigeration for the process is maintained at a desired constant pressure by means of an air heated pressure coil 90 which is part of the abovementioned conventional pressure building circuit 97. A back pressure regulator 102 connected to the vapor space of the tank prevents an undesired buidup in tank pressure due to heat leak, should this occur. This is also a conventional arrangement necessary to keep the tank from exploding.

The system which is illustrated in FIGS. 2 and 3, and which is designed to handle approximately 30 scfm of condenser leakage may be easily placed in a room approximately 30 feet on a side with a 20 foot ceiling. The room should be appropriately shielded and may be located unobtrusively in the area of the nuclear plant. The facility may be easily placed underground or on shipboard. The system does not require a stack and is instrumented to operate automatically within a shielded environment.

The refrigeration for the process is supplied by the liquid nitrogen which may be trucked to the site. The nitrogen keeps the xenon delay tank and the emergency dump tank cold, and supplied refrigeration to the liquefier and freeze out exchangers and can be used to purge the exchangers if needed. Even in the event of a total electrical power failure the nitrogen storage tank would still be available to supply needed refrigeration to the storage tanks.

In the interest of providing a safety factor to alleviate the fears of the public, the plant may be designed to handle 100 times as much radioactivity and leakage as that expected. Due to the nature of the unique purification process employed, a plant with a safety factor of 100 or more will still be relatively small in size, economical to build and operate, and unobtrusive in character.

No detailed description of the control circuitry or structure has been given in that various types may be employed successfully. For example the valves such as 77, 89, etc., may be operated pneumatically, electrically, hydraulically, etc. Many types of temperature and pressure recording and controlling equipment may be used in conjunction with the control circuitry for the valves and regulators.

The capacities, delay times, pressures, temperatures, outputs, etc., which have been given in the above description are given for purposes of illustration and variations therefrom to handle various gas leakage flows, radioactive contamination levels, different isotopes and combinations and mixtures thereof, may be made without departing from the invention. For example the process could be easily adapted to treat a gas stream having a radioactive contaminant other than krypton and xenon. The present invention is especially suited for treating off gases from a nuclear power generating plant utilizing a boiling water reactor, however it can also be used with plants having other types of reactors. The invention may be used wherever there is a need for treating a fluid stream containing radioactive contaminants.

While we have shown and described a specific embodiment of our invention, it will be readily apparent that many minor changes of structure and operation could be made without departing from the spirit of the invention as defined by the scope of the appended claims.

We claim:

1. A process for treating off gases containing radioactive krypton and xenon from a nuclear power generating plant, comprising the steps of removing substantially all of the water and carbon dioxide from said off gases and storing said water and carbon dioxide for a period of time sufficient to insure that the level of radioactivity of the contaminants in the water and carbon dioxide is reduced to a tolerable level and then releasing said water and carbon dioxide to the atmosphere, separating at least part of the xenon present in the off gases by distillation, storing the xenon until its level of radioactivity is reduced to a tolerable level, liquefying the remaining off gases and storing the resulting liquid until its level of radioactivity is reduced to a tolerable level.

2. The process defined in claim 1 in which the off gases comprise air substantially saturated with water vapor.

3. The process defined in claim 2 characterized by removing at least part of said water vapor from said off gases by cooling said off gases to condense said water vapor, storing said condensed water vapor in a shielded environment until the level of radioactivity of the condensed water vapor reaches a tolerable level, and then releasing the water from said environment.

4. The process defined in claim 3 characterized by continually sensing the level of radioactivity in the water being released to insure that a tolerable level of radioactivity is not exceeded, ceasing the release of said water when said level is reached.

5. The process defined in claim 1 characterized by removing at least part of said carbon dioxide by lowering the temperature of said off gases to a temperature causing said carbon dioxide to freeze out, storing the carbon dioxide in a shielded environment until the level of radioactivity of the carbon dioxide reaches a tolerable level, and then releasing the carbon dioxide from said environment.

6. The process defined in claim 1 characterized by refrigerating the xenon during storage to maintain said xenon in liquid form while in storage.

7. The process defined in claim 6 characterized by refrigerating said xenon with liquid nitrogen.

8. The process defined in claim 6 characterized by releasing said xenon from storage when its level of radioactivity has been reduced to a tolerable level, utilizing at least part of the refrigeration capacity of said released xenon in the liquefying of the said remaining off gases.

9. The process defined in claim 1 wherein the remaining off gases contain at least part of the krypton in said off gases and storing said resulting liquid containing krypton in a storage vessel until its level of radioactivity has been reduced to a tolerable level.

10. The process defined in claim 9 characterized by releasing said liquid when said level has been reached and utilizing at least part of the refrigeration capacity of said liquid to liquefy the remaining off gases.

11. The process defined in claim 1 characterized by passing the xenon and the said resulting liquid through delay tanks wherein the storage takes place, and then intermixing the xenon and the resulting liquid and passing the mixture through a storage vessel.

12. The process defined in claim 11 characterized by sensing the radioactive level of the mixture leaving said storage vessel and storing said mixture in said vessel when an unacceptable level is reached.

13. The process defined in claim 12 characterized by refrigerating said storage vessel when a mixture is being stored therein to reduce pressure buildup in said vessel.

14. A process for treating a gas stream containing radioactive krypton and xenon comprising separating at least part of the xenon present in the stream by distillation, storing the radioactive xenon until it is safe to discharge into the atmosphere, storing the remainder of the gas stream until it is safe to discharge into the atmosphere.

15. A process as defined in claim 14 characterized by liquefying at least part of the remainder of the said gas stream and storing said liquid until it is safe to discharge into the atmosphere.

16. The process defined in claim 11 characterized by refrigerating the delay tank in which the xenon is stored with a cryogenic refrigerant, controlling the temperature of the refrigerant exhaust to maintain the xenon at a desired low temperature.

* * * * *